United States Patent [19]

Snow

[11] Patent Number: 5,226,405
[45] Date of Patent: Jul. 13, 1993

[54] IGNITION PLATFORM AND FUEL COMPONENT FOR KINDLING A FIRE

[76] Inventor: George H. Snow, 613 S. Main St., Westfield, Wis. 53964

[21] Appl. No.: 846,645

[22] Filed: Mar. 5, 1992

[51] Int. Cl.$^5$ ............................................. F23H 1/02
[52] U.S. Cl. .................................. 126/25 B; 126/25 R; 126/163 R
[58] Field of Search ............... 126/25 R, 26, 29, 25 B, 126/163 R, 163 A

[56] References Cited

U.S. PATENT DOCUMENTS

| | | |
|---|---|---|
| Re. 15,851 | 6/1924 | Garrett . |
| 1,767,293 | 6/1930 | Krei et al. . |
| 1,966,945 | 7/1934 | Bowers ............................ 126/25 B |
| 2,939,773 | 6/1960 | Rymer .............................. 126/25 B |
| 2,948,594 | 8/1960 | Doyle . |
| 3,209,743 | 10/1965 | Stewart et al. .................. 126/25 B |
| 3,236,225 | 2/1966 | Jureit . |
| 3,759,675 | 8/1973 | Lazarus et al. . |
| 3,934,520 | 11/1976 | Brennan et al. . |
| 4,008,703 | 2/1977 | Allgood . |
| 4,189,305 | 2/1980 | Clayton . |
| 4,485,584 | 12/1984 | Raulerson et al. . |
| 4,503,835 | 3/1985 | Williams . |
| 4,518,394 | 5/1985 | Templin et al. . |
| 4,564,370 | 1/1986 | Gregory . |

FOREIGN PATENT DOCUMENTS

| | | |
|---|---|---|
| 784409 | 7/1935 | France ............................. 126/163 A |
| 1320600 | 6/1987 | U.S.S.R. ........................... 126/163 R |
| 241394 | 10/1925 | United Kingdom ........... 126/163 A |

*Primary Examiner*—Carl D. Price
*Attorney, Agent, or Firm*—Ross & Stevens

[57] ABSTRACT

An ignition system 10 for kindling a fire includes an ignition platform 16 and a fuel component 16. The platform 16 includes an upper surface 20 and lower surface 22, air inlet apertures 36,37 and air outlet apertures 31. The apertures are designed to direct cold air through the fuel component 18 in order to intensify the combustion of the fuel component. Intensified combustion increases the rate of ignition of a fuel source, such as charcoal or firewood. The fuel component includes a paraffin wax, a microcrystalline wax, PET hydrocarbon, and SER-refined petrolatum.

10 Claims, 2 Drawing Sheets

IGNITION PLATFORM AND FUEL COMPONENT FOR KINDLING A FIRE

FIELD OF THE INVENTION

The present invention relates to a system for igniting a fire. The invention is more particularly directed to an ignition platform and a fuel component for use in the rapid ignition of charcoal-fires in a coal stove or charcoal grill, or the ignition of wood in a fireplace. While there are many reasons for starting fires, the present invention will be specifically directed to a system for starting cooking, camping or fireplace fires.

DESCRIPTION OF PRIOR ART

The primary source of heat for a cooking or fireplace fire is either charcoal or wood, hereinafter referred to as the "fuel source." In order to satisfactorily ignite a fire, the fuel source must reach its ignition temperature.

There are a number of devices and methods in the prior art for igniting charcoal or wood. The methods run the gambit from crumpled balls of paper to flammable liquid fuels and waxy-coated combustible materials. Although paper is easily ignitable, it tends to burn too quickly. Therefore, it does not raise the temperature of the fuel source to the ignition point effectively. Flammable liquid fuels are more efficient for heating the fuel source to ignition temperature. However, their high volatility creates a safety hazard. Additionally, liquid fuels sometimes have an unpleasant odor associated with the fire, which odor can pass onto food. Wax-impregnated paper, wood and other types of cellulosic material are advantageous in that they are easy to work with and create a sufficient heat to ignite the fuel source. However, these materials sometimes tend to produce an unpleasant odor, which may affect nearby food, and a waxy or charred residue on the surface on which they were placed.

SUMMARY OF THE INVENTION

The present invention is directed to an ignition platform which is used to rapidly ignite coal or charcoal-fires in a coal stove or charcoal grill, or wood in a fireplace. Specifically, the present invention is directed to an ignition platform for use with a fuel component. The ignition platform includes an upper surface adapted to support the fuel component, and a lower surface attached to the upper surface, such that the upper and lower surfaces define an open air space between them. The upper surface includes a plurality of air outlet apertures extending through the upper surface. The lower surface comprises a plurality of first air inlet apertures, such that the first air inlet apertures do not align with the air outlet apertures.

The fuel component for kindling the fire comprises a combustible cellulosic material impregnated with an impregnating mixture. The mixture includes from about 20% (v/v) to about 40% (v/v) low melt paraffin, about 50% (V/v) to about 70% (v/v) microcrystalline wax, about 3% (v/v) to about 10% (v/v) PET hydrocarbon, and about 3% (v/v) to about 10% (v/v) ser-refined petroleum. The impregnating mixture is heated to melting temperature and applied to the cellulosic material. The fuel is made by liquefying the wax substance by heating. The cellulosic material is then impregnated with the waxy liquid and allowed to dry.

The present invention is also directed to an ignition system for starting a fire comprising an ignition platform, which ignition platform includes an upper surface adapted to support a fuel component, and a lower surface attached to the upper surface. The upper and lower surfaces define an open air space between them. The upper surface includes a plurality of spaced-apart air outlet apertures extending through the upper surface. The lower surface comprises a plurality of spaced-apart first air inlet apertures, such that the first air inlet apertures do not align with the air outlet apertures. The system also includes a fuel component.

The present invention is also directed to a method for kindling a fire comprising assembling a fuel source to be ignited in juxtaposition with an ignition system as described above. The fuel component is placed on the upper surface on the ignition platform in a quantity sufficient to ignite the fuel source. The fuel component is ignited to heat the upper surface, causing a vacuum in the open air space in the ignition platform. The vacuum will force air through the first air inlet apertures into the open air space, and through the air outlet apertures, such that the air will communicate with the ignited fuel component to increase the intensity of the resulting flame and heat to ignite the fuel source.

The fuel component provides a clean, substantially smokeless product for the ignition of fires. In solid form, it is essentially non-volatile, safe to store and transport, and easy to pack and handle. It is also substantially waterproof and imparts no unwanted taste or odor to food cooked over it.

The combination of the ignition platform and the fuel component provides an ignition system designed to ignite a fuel source in a very short period of time.

In operation, the platform creates a wind tunnel effect, drawing air through the inlet apertures in the lower surface of the platform and through the side air spaces into the air space between the upper and lower surfaces. This air is then drawn out through the outlet apertures in the upper surface at rapid speed. The combination of the air blast and the ignited fuel component creates a hotter flame, which in turn accelerates the ignition time for the fuel source.

These and other objects of the present invention will be more completely disclosed in the following specification, the accompanying drawings, and the appended claims.

DESCRIPTION OF THE PREFERRED EMBODIMENTS

Figure 1:
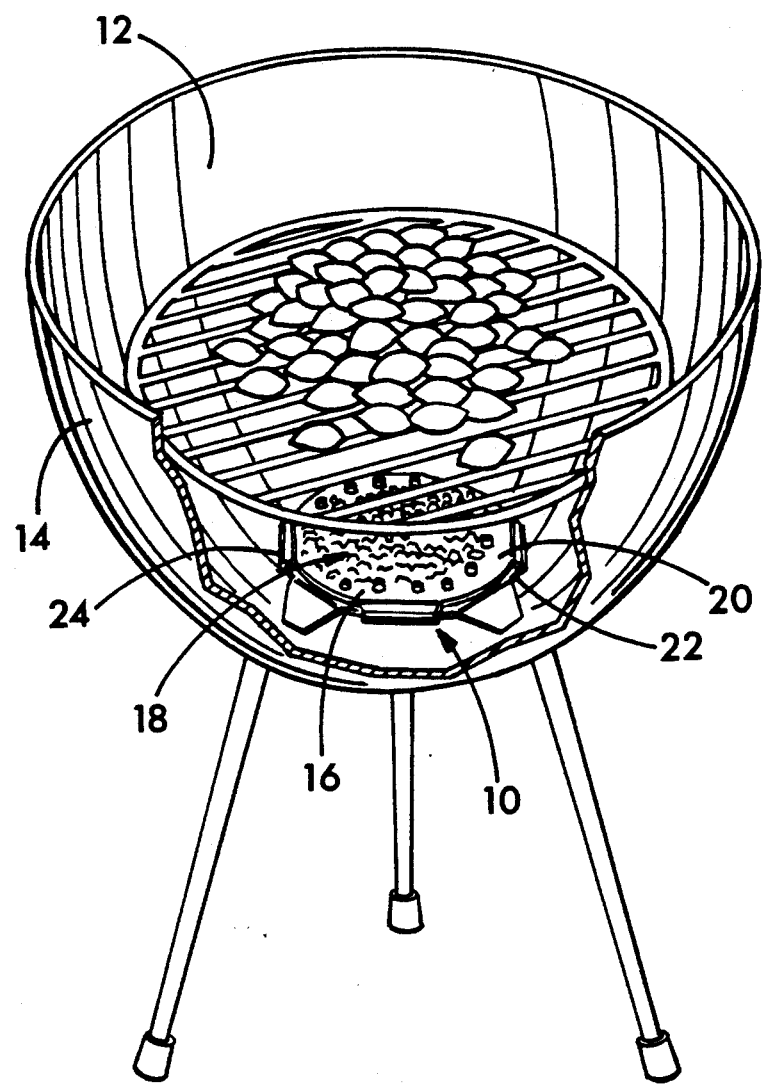
FIG. 1 is a perspective view of the ignition system positioned within the bowl of a partially-cutaway conventional barbecue grill for igniting charcoal briquettes contained therein in accordance with the present invention.

Referring to the drawings, there is illustrated the ignition system of the present invention, generally designated by the numeral 10 adapted to be positioned within a bowl 12 of a conventional charcoal barbecue grill 14. It is also within the scope of the present invention to adapt the use of the ignition system 10 to other uses, such as a fireplace (not shown).

The ignition system 10 comprises a platform 16 upon which is placed a fuel component 18.

Figure 4:
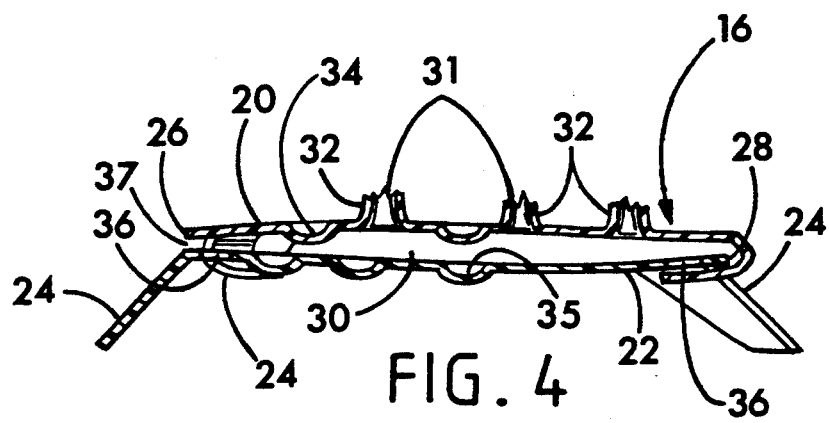
FIG. 4 is a side view of the ignition platform taken along lines 3—3 of FIG. 2.

The platform 16 is a two-layer structure, including an upper surface 20 and a lower surface 22. It is within the scope of the present invention to include support structures or legs 24, as illustrated in FIGS. 1 and 4.

The platform 16 is preferably made from an incombustible, non-corroding material, such as stainless steel or aluminum. It is within the scope of the present invention to make the platform 16 disposable. Therefore, the platform 16 may be made of a substantially incombustible material, suitable for one or two uses. Materials such as aluminum foil are contemplated here.

Figure 2:
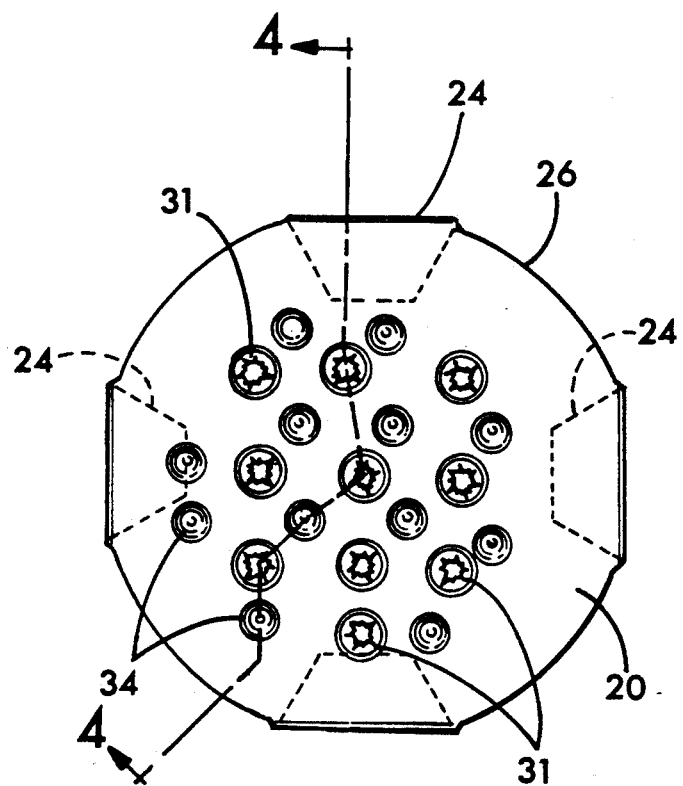
FIG. 2 is a top plan view of the ignition platform, illustrating the upper surface.
Figure 3:
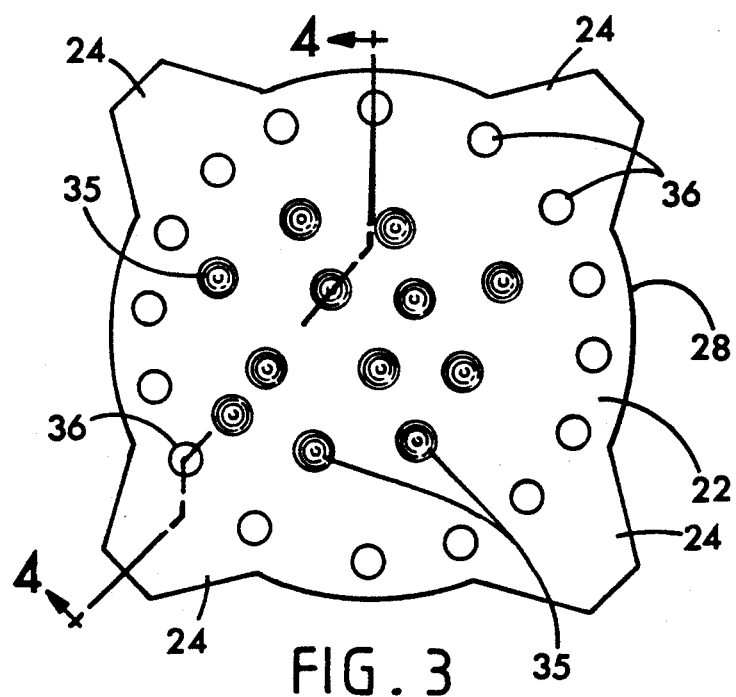
FIG. 3 is a bottom plan view of the ignition platform, illustrating the lower surface.

As illustrated in FIGS. 2 and 3, the upper and lower surfaces 20, 22 of the platform 16 have a generally round configuration. It is within the scope to provide other shapes for the platform 16 as desired.

The upper and lower surfaces 20, 22 are connected at their edges 26, 28 respectively, such that an air space 30 is provided between the upper and lower surfaces 20, 22.

Referring now to FIG. 2, the upper surface 20 is characterized by a plurality of air outlet apertures 31 extending through the upper surface 20. The air outlet apertures 31 are preferably positioned in spaced relationship away from the edge 26 and near the center of the upper surface 20. As illustrated in FIG. 4, the air outlet apertures 31 are also characterized by raised walls 32. The raised walls are designed to form tiny chimneys, the purpose of which will be described later.

The upper surface 20 is also characterized by a plurality of dimples 34. The dimples 34 are designed to create pockets or indentations in the upper surface 20, which pockets are designed to catch wax melting from the fuel component 18. This prevents the wax from running off the platform 16, thereby leaving a residue in the bowl 12 of the grill 14. The wax, which remains in the dimples 34, can then be reheated and dissipated.

The lower surface 22 includes a plurality of first air inlet apertures 36. Unlike the air outlet apertures 31 of the upper surface 20, the first air inlet apertures 36 of the lower surface 22 are preferably placed near the edge 28 of the lower surface 22. Additionally, the lower surface 22 preferably includes a plurality of spaced-apart dimples 35, similar to the dimples 34 on the upper surface 20. The dimples 35 are intended to trap any wax drippings from the combusted fuel component.

Because the apertures 31 and 36 are not in alignment, any wax drippings from the combusted fuel component on the upper surface 20, which fall though the air outlet apertures 31 will not pass through the first air inlet apertures 36. This avoids any residue of the wax on the bowl 12 of the grill 14. Side inlet apertures 37 may also be added to the platform 16 to assist the air flow through the platform.

The fuel component, for use with the platform 16, comprises a combustible cellulosic material impregnated with an impregnating mixture. The cellulosic material can be a single material or a mixture of suitable materials such as wood, paper, cotton, hemp, jute, straw, leaves, shells, and the like. Suitable shapes include cubic, rectilinear or other suitably-shaped three-dimensional configurations, which afford a coarse, impregnatable material having a large surface area. The preferred product is a wood chip having a length from approximately 0.75 inches to about 2.5 inches and a thickness from approximately 0.25 to approximately 0.5 inches. The natural shape of a wood chip is curled. This advantageously avoids any stacking effect when the wood chips are bunched or grouped together. The curl also allows a significant air space between the wood chips to assist in igniting the chip. Preferably, the wood chips are seasoned, i.e., dried, to enhance combustibility. The chips may be seasoned by drying the log (or the chips) naturally. Alternatively, the wood may be kiln dried.

The entire surface of the cellulosic material is designed to be impregnated with an impregnating mixture of specified proportions.

The impregnating mixture is made of a blend of waxes and other ingredients including specified portions of a low-melt paraffin wax, preferably having a melting temperature between 115° F. and 160° F., a microcrystalline wax, preferably having a melting temperature between 140° F. and 200° F., polyethylene terephthalate (PET) hydrocarbons, and serine-refined (ser-refined) petrolatum. The ingredients are blended (v/v) as follows:

| Ingredient | Range (v/v) | Preferred Quantity |
| --- | --- | --- |
| Low melt paraffin | 20-40% | 30% |
| Microcrystalline wax | 40-70% | 60% |
| PET hydrocarbon | 3-10% | 5% |
| ser-refined petrolatum | 3-10% | 5% |

The blend of ingredients results in an impregnating mixture having a melting point of approximately 140° F. and a high flash point. The impregnating mixture is a highly volatile, hot burning combination of cellulosic material and wax.

The impregnating material is prepared by first melting the waxes to a temperature of approximately 180° F. and stirring in the remaining ingredients. Impregnation of the cellulosic material with the impregnating mixture is carried out at any suitable temperature which keeps the impregnating mixture in a liquid state. Preferably, the temperature is between about 18020 and 200° F.

The cellulosic material is impregnated with the mixture by simply dipping the material into an open vat of the liquid impregnating mixture and allowing the material to remain in contact with the mixture for a sufficient time to permit the mixture to impregnate the material. The time of impregnation is dependent upon the temperature of the mixture and the type of material to be impregnated. Generally, a dipping or impregnating time of 3 seconds is sufficient to prepare a fuel component consisting of a wood chip and the above-described impregnating mixture.

It is of course within the scope of the present invention to employ other impregnating methods known to those having skill in this art, including coating or painting, spraying, pressure impregnating or the like.

While the fuel component may be used alone, it is specifically designed for use with the platform 16, as described previously. The platform 16 can also be applied to other types of fire starters. However, preferred results are accomplished with the combination of the platform 16 and the above-described fuel component, which results in an ignition system 10 designed to create a much improved heat intensity over the prior art for igniting a fuel source.

In operation, the platform 16 may be designed to be placed on or within the bowl 12 of a barbecue grill 14 below the fuel source, i.e., charcoal, to be ignited. A quantity of the fuel component 18 is placed on the upper surface 20 of the platform 16. The amount of fuel component needed is dependent upon the intensity and length of fire desired and the requirements for igniting the fuel source. Generally, an eight to ten ounce quantity, e.g., a handful, of the fuel component should ignite a standard charcoal fuel source. The fuel is then ignited by lighting the fuel component 18.

After the fuel component 18 has been ignited, the design structure of the platform 16 acts in concert with the ignited fuel component 18 to create an enhanced flame for igniting the charcoal. Basically, the platform 16 creates a wind tunnel or heat exchanger effect, which draws air through the first air inlet apertures 36 of the lower surface 22 and the second side inlet apertures 37 into the air space 30, and out through the air outlet apertures 31 of the upper surface 20.

Essentially, the ignition process is as follows. The ignited fuel component 18 causes the upper surface 20 to heat up to very hot proportions and forces cold air through the first air inlet apertures 36 and second air inlet apertures 37 and then through the air outlet apertures 31 in the upper surface 20. Aside from creating a much hotter fire, the fuel component 18 is completely dissipated, thereby getting maximum use and efficiency from the fuel component 18 and leaving virtually no residue. Advantageously, the walls 32 of the apertures 30 further act as a chimney, to direct the air flow. This "chimney effect" further increases the intensity and force of cold air fanning the heat of the fuel component 18, thereby creating a hotter fire which will ignite the fuel source faster.

Test runs conducted utilizing this heat have resulted in a fully-ignited bed of charcoal within 5 to 15 minutes from the ignition of the fuel component.

In order that those skilled in the art can more fully understand the present invention, the following example is given solely for the purpose of illustration. The example should not be considered as limiting the invention.

EXAMPLE

A liquid impregnating mixture was prepared by mixing the following components: 30% (v/v) low melt paraffin (melting temperature 115°–160° F.), 60% (v/v) microcrystalline wax (melting temperature 140°–200° F.), 5% PET hydrocarbon and 5% SER-refined petrolatum. The mixture was prepared by heating the wax to approximately 180° F. until it melted, and then adding the remaining components, with stirring.

Wood chips from a kiln-dried log (dried up to 30 days to ensure seasoning) having a wood chip size ranging from 0.75 inches to 2.5 inches in length, and a thickness from 0.25 inches to 0.5 inches, was then dipped in the heated impregnating mixture for approximately 3 seconds. The impregnated wood chip was then removed and allowed to cool to room temperature.

The dried impregnated wood chips remained dry to the touch, non-tacking and essentially odor-free.

The chip could then be used in the process described previously.

It is understood that the invention is not confined to the particular construction and arrangement herein illustrated and described, but embraces such modified forms thereof as come within the scope of the following claims.

What is claimed is:

1. An ignition platform, for use with a fuel component, comprising an upper surface adapted support a fuel component, a lower surface attached to the upper surface such that the upper and lower surfaces define an open air space between them, wherein the upper surface includes a plurality of spaced-apart air outlet apertures extending through the upper surface, and the lower surface comprises a plurality of spaced-apart first air inlet apertures, such that the first air inlet apertures do not align with the air outlet apertures, the lower surface further including a plurality of dimples opening upwardly.

2. The ignition platform of claim 1 further comprising means to support the ignition platform.

3. The ignition platform of claim 1, wherein the upper surface includes a plurality of dimples.

4. The ignition platform of claim 1 further includes a plurality of spaced-apart second air inlet apertures positioned at the point of attachment between the upper surface and lower surface.

5. The ignition platform of claim 1, wherein the air outlet apertures comprise raised walls.

6. An ignition system for starting a fire comprising:
   a. an ignition platform, which ignition platform includes an upper surface adapted to support a fuel component, and a lower surface attached to the upper surface such that the upper and lower surfaces define an open air space between them, wherein the upper surface includes a plurality of spaced-apart air outlet apertures extending through the upper surface, and the lower surface comprises a plurality of spaced-apart first air inlet apertures, such that the first air inlet apertures do not align with the air outlet apertures, the lower surface further including a plurality of dimples opening upwardly; and
   b. a fuel component.

7. A method for kindling a fire comprising:
   a. assembling a fuel source to be ignited in juxtaposition with an ignition system, the ignition system comprising:
      i. an ignition platform, which ignition platform includes an upper surface, a lower surface attached to the upper surface such that the upper and lower surfaces define an open air space between them, wherein the upper surface includes a plurality of spaced-apart air outlet apertures extending through the upper surface, and the lower surface comprises a plurality of spaced-apart first air inlet apertures, such that the first air inlet apertures do not align with the air outlet apertures, the lower surface further including a plurality of dimples opening upwardly, and
      ii. a fuel component on the upper surface on the ignition platform in a quantity sufficient to ignite the fuel source, the fuel component comprising an ignitable material; and
   b. igniting the fuel component whereby the ignited fuel component will heat the upper surface, casing a vacuum in the open air space in the ignition platform, which vacuum will force air through the first air inlet apertures into the open air space, and through the air outlet apertures, such that the air will communicate with the ignited fuel component to increase the intensity of the resulting flame and heat to ignite the fuel source.

8. The method of claim 7, wherein the upper surface of the ignition platform includes a plurality of dimples to trap any residue from the fuel component.

9. The method of claim 7 wherein the ignition platform includes a plurality of spaced-apart second air inlet apertures positioned at the point of attachment between the upper surface and lower surface to force air into the open air space when the fuel component is ignited.

10. The method of claim 7, wherein the air outlet apertures comprise raised walls to direct the air to the ignited fuel component.

* * * * *